April 19, 1938.　　　　G. H. TABER　　　　2,114,481
VEHICLE WHEEL ALIGNING APPARATUS
Filed Jan. 21, 1936　　　4 Sheets-Sheet 1
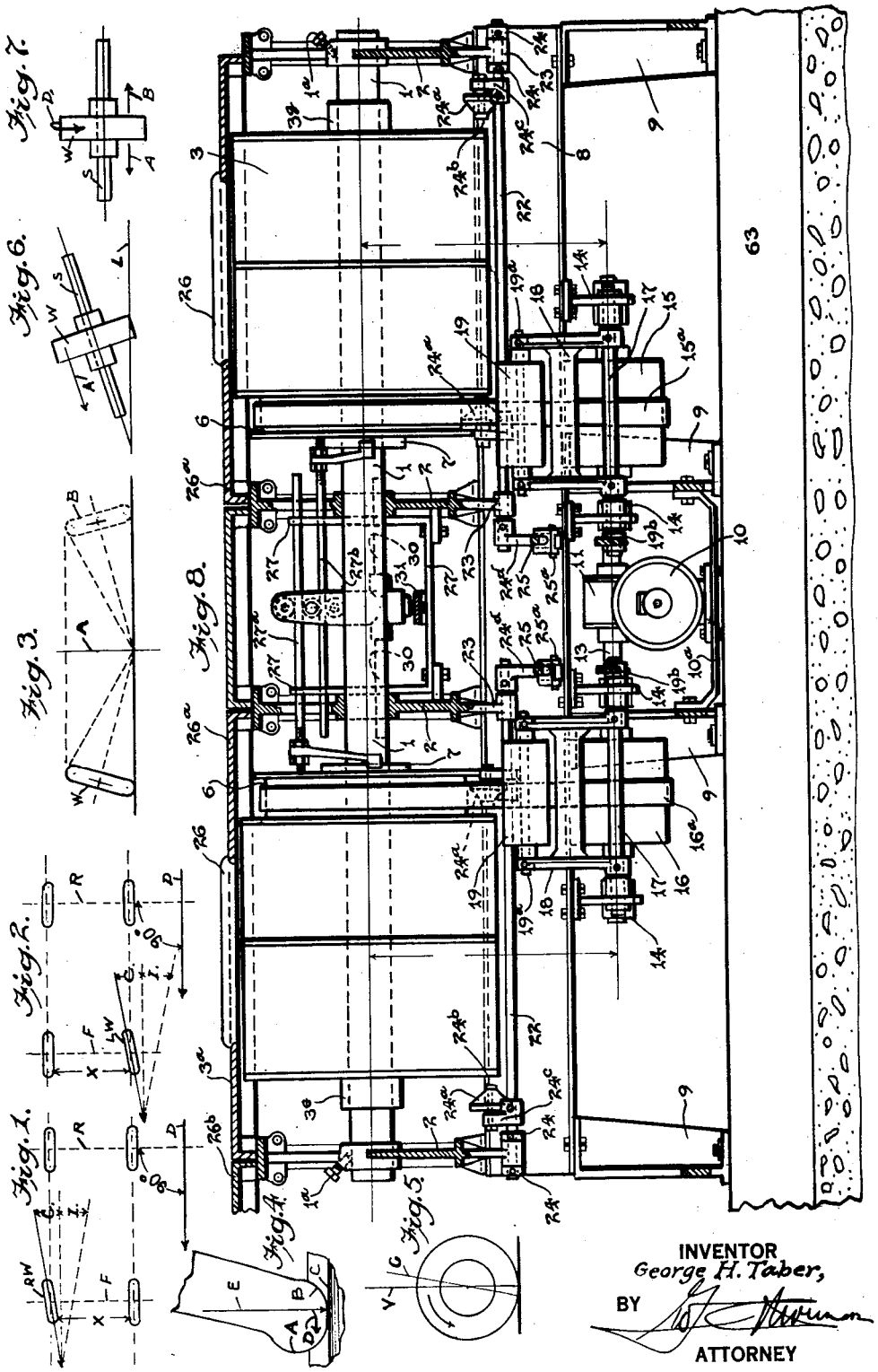
INVENTOR
George H. Taber,
BY
ATTORNEY April 19, 1938. G. H. TABER 2,114,481
VEHICLE WHEEL ALIGNING APPARATUS
Filed Jan. 21, 1936 4 Sheets-Sheet 2
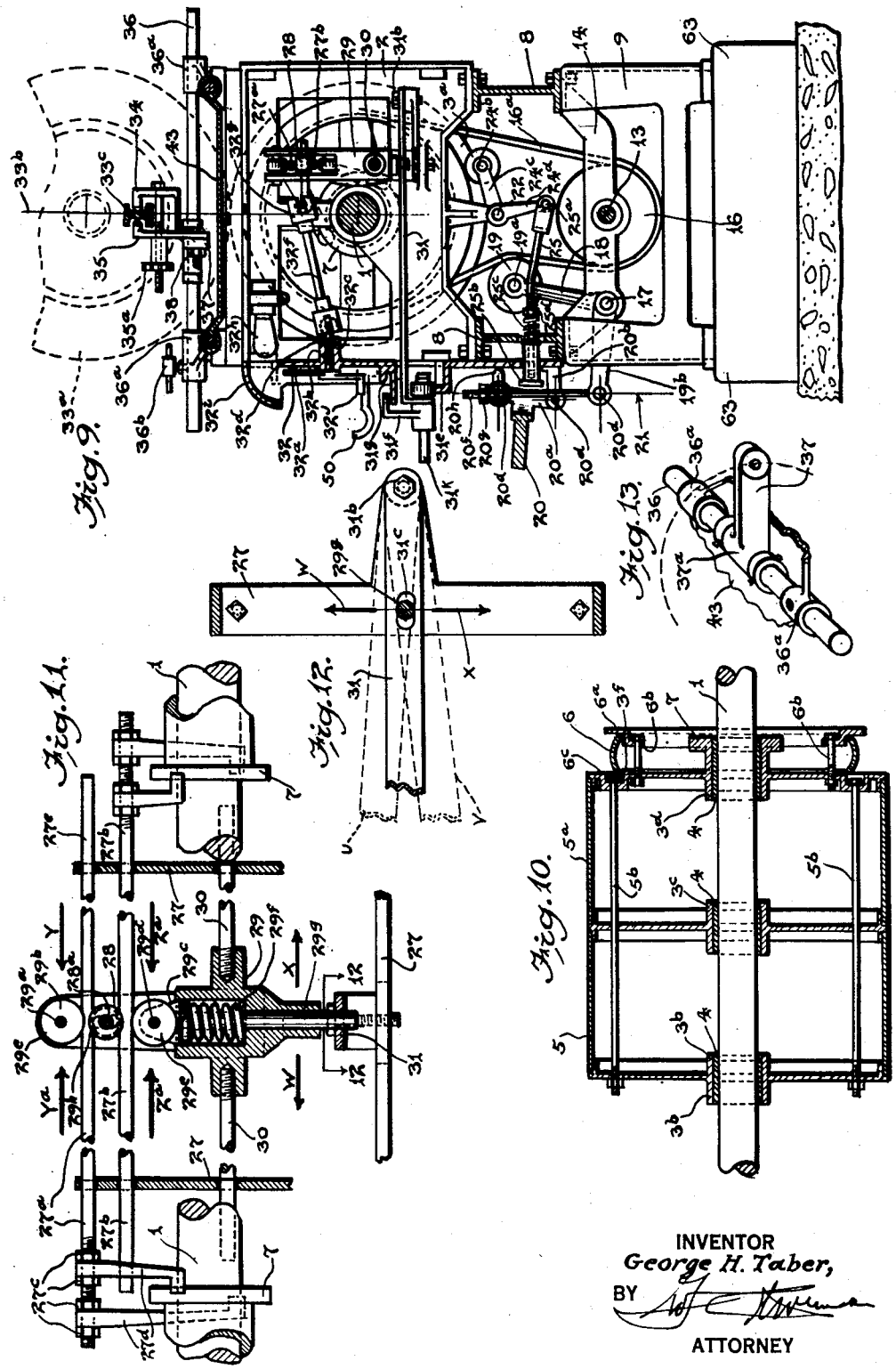
INVENTOR
*George H. Taber,*
BY
ATTORNEY April 19, 1938. G. H. TABER 2,114,481
VEHICLE WHEEL ALIGNING APPARATUS
Filed Jan. 21, 1936 4 Sheets-Sheet 3
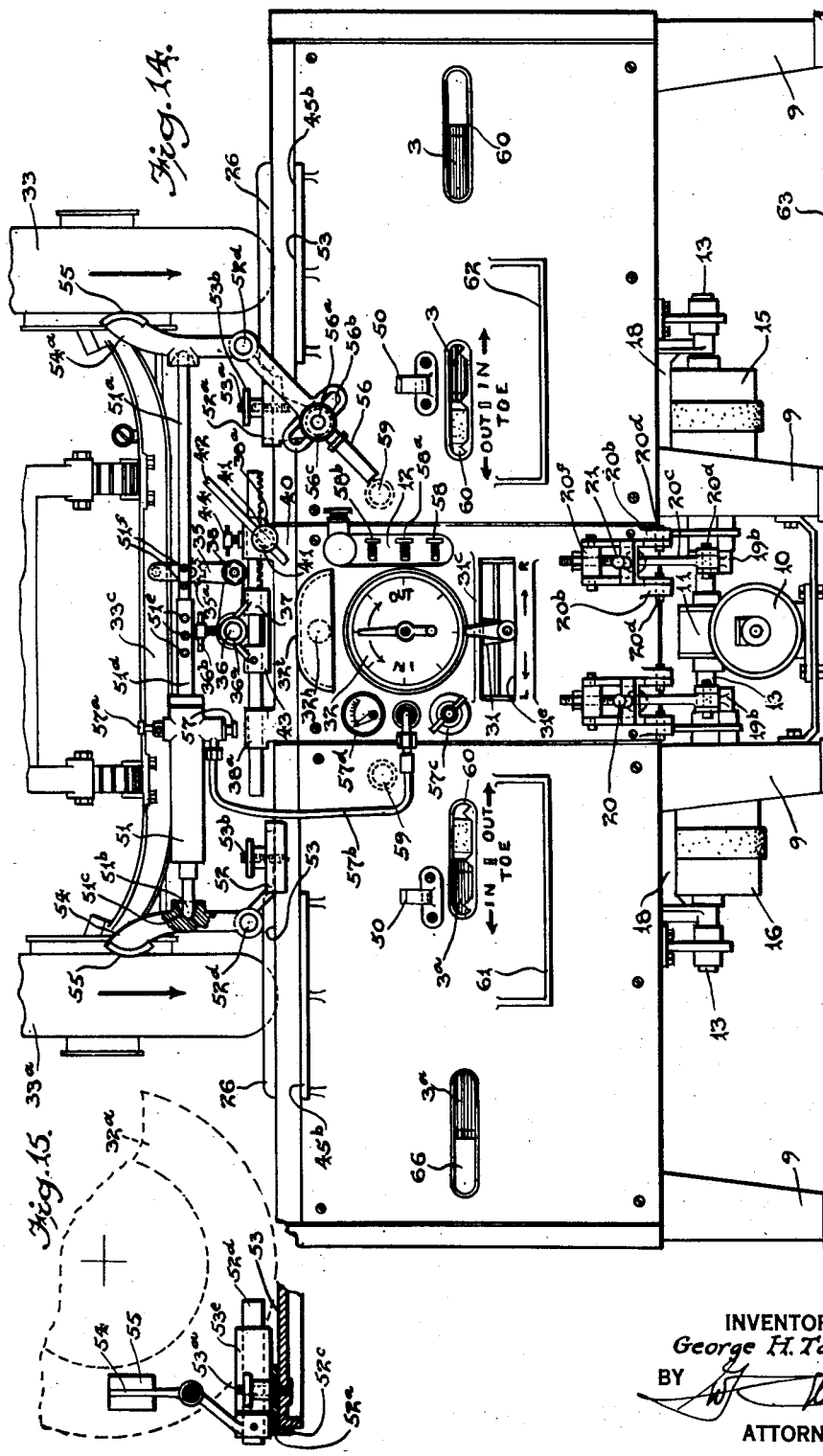
INVENTOR
George H. Taber,
BY
ATTORNEY April 19, 1938.　　　G. H. TABER　　　2,114,481
VEHICLE WHEEL ALIGNING APPARATUS
Filed Jan. 21, 1936　　　4 Sheets-Sheet 4
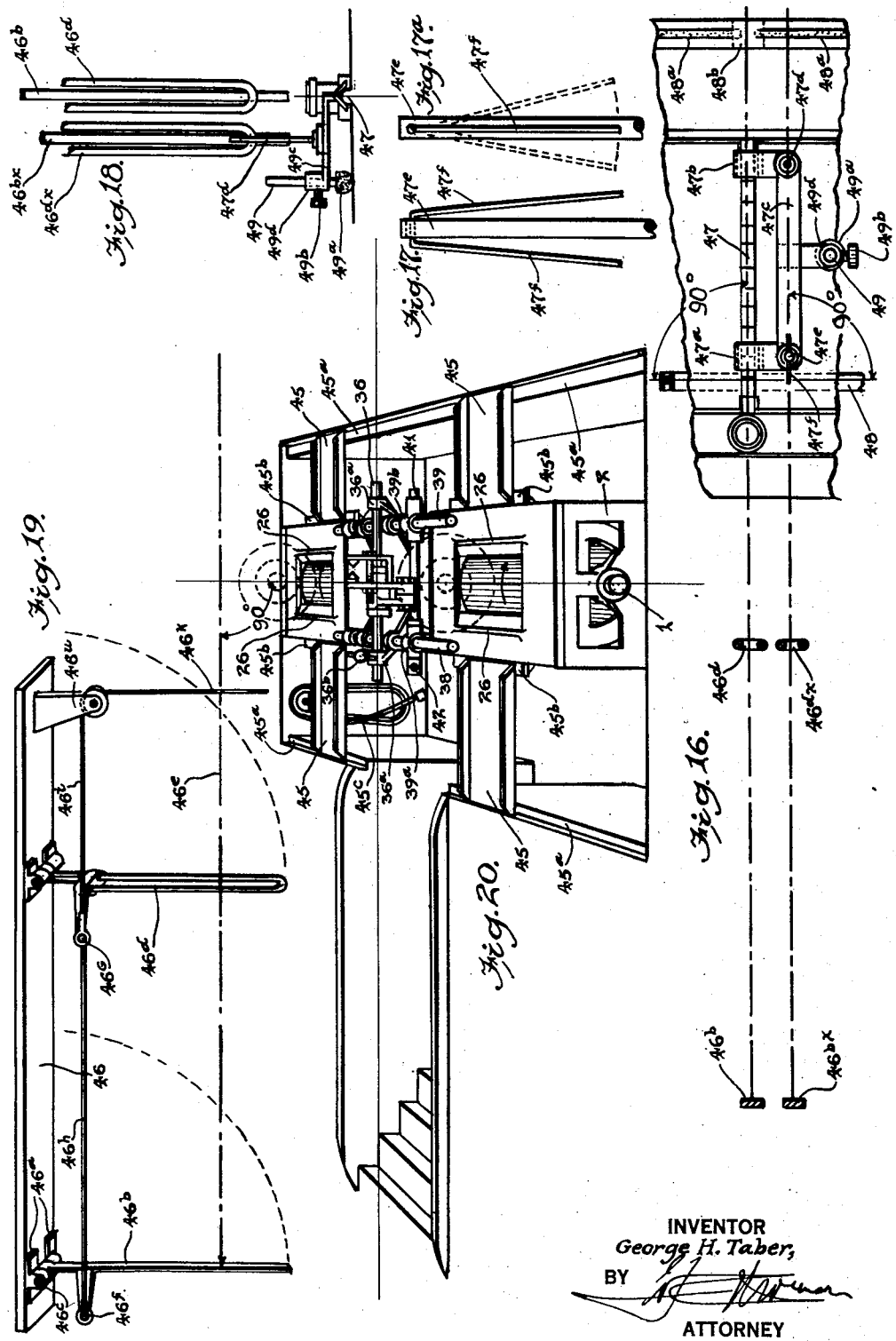
INVENTOR
George H. Taber,
BY
ATTORNEY Patented Apr. 19, 1938

2,114,481

UNITED STATES PATENT OFFICE 2,114,481

VEHICLE WHEEL ALIGNING APPARATUS

George H. Taber, Binghamton, N. Y.

Application January 21, 1936, Serial No. 60,126

19 Claims. (Cl. 33—203)

This invention provides, in a wheel aligning machine and among other things, means to eliminate at rest or static friction which would otherwise act as a resistance factor against the axial movement of rotatable elements on their axis shaft. It is also constructed so that the force used to cause the rotation of the rotatable elements will not cause resistance to the axial movement of the rotatable elements on the shaft; in other words, driving static friction is eliminated. The whole structure is furthermore arranged to eliminate all possible resistance to any and all axial movement of the gaging elements, so that a supersensitive indicating means is provided which can and does indicate to an operator thereof the true axial thrust tendencies existing relative to the running alignment of the two wheels of a vehicle axle, particularly the steering wheels.

Through the daily use of this method of wheel alignment in my shop, I have discovered that it is impossible to properly align the steering wheels of a vehicle by measurement and that, therefore, means must be provided, wherein the forces relative to the alignment thrust conditions of the two steering wheels can indicate, without interference, and due to said wheels effecting an axial movement of the indicating medium, the exact alignment thrust condition of the two wheels, and do this while all factors are involved, such as camber, caster, working clearance in alignment means of the steering wheels, weight of car on wheels, wheels rotating in their regular running direction, tire inflation, pattern of tire tread and degree of yield in members of alignment connections of the wheels.

I have also discovered that the two steering wheels must have a relative toe-in condition, taking into consideration such yield as exists in the alignment adjustment means of the steering connections, so that the running alignment will be straight when the car is driven fast, since otherwise yield, if the alignment of the wheels be set as straight relative to each other, will produce a toe-out condition when the car is so driven because of the drag of the wheels on the roadway and because of air resistance to the wheels in forward travel thereof.

The hereinafter described means for determining the required degree of toe-in, so that the two wheels may steer the same as if they were truly one wheel, is based to some extent on the known wear characteristics as registered on either the right front tire or the left front tire. Heretofore, it has been understood that when the right front tire showed more wear than the left tire, it was the result of "ditch wear". I find, through the study of wear characteristics, that excessive toe-in results in the right front tire wearing more than the left tire and that toe-out causes the left front tire to wear more than the right front tire, but this tire wear knowledge is most important in conjunction with my sensitive indication means and a spreader device between the two front tires while their wheels are being rotated, to make possible a new method of determining actual requirements for true running wheel alignment, wherein either wheel showing slightly more wear than the other, because of time and service, becomes the dictator of the degree of toe-in as is required for a specific car, or speed condition involved, because of yield in the alignment adjustment means.

This invention is provided with means to easily and accurately correct wheel alignment in the minimum use of time. The operator is not required to push or pull the car being tested. The machine being in a pit provides unhampered movement for the operator at all times. The operator can easily drive the car on the machine without the assistance of any other party.

Among the many objects of the invention is to provide an apparatus employing a straight, rigid, level axis shaft on which two rotatable elements can rotate and move axially if urged to do so because of an alignment thrust condition existing between the wheels of a vehicle axle when such wheels are in proper cooperative engagement with the rotatable elements, whereby the two rotatable elements serve as a straight split roadway and the relative alignment relation existing between the two wheels of an axle may be caused to function in a properly checked and corrected manner to roadway interference and conditions, incident to unlimited travel distance.

Another object is to provide means whereby at rest or static friction is reduced to a minimum relative to axial movement of an element on an axis shaft so that said element may respond to the urge caused by axial thrust conditions of the two wheels of a vehicle being tested for such conditions.

Another object is to provide means whereby driving static friction will be eliminated relative to a rotatable element, subjected to axial movement on its axis shaft, and rotational force applied thereto through a belt, like means having the power of axial yield in its transmission of rotational force to said rotatable element from a suitable source of rotation.

Another object is to provide an apparatus operating in a pit of a depth permitting the surface of the wheel engaging portion of the invention to be flush with floor level, and having proper space around the invention to permit an operator to walk around in said space while making corrections or operating the control means of the invention, said pit including stairsteps for operator or customer to enter or leave pit.

Another object is to provide means whereby a pit specifically for a wheel alignment means is provided with bridging means to support the vehicle while being run on said alignment means, said bridging means being removable so as to permit unhampered movement of the operator, and said pit being deep enough to permit the operator to stand under the vehicle and including connections for compressed air to inflate the tires of wheels being tested on alignment means and to be used as energy in association with the alignment mechanism, and further including electrical connections to provide power of rotation and for lights illuminating certain instruments.

Another object is to provide means to hold the axle of a vehicle in such a manner that the two wheels thereof may be moved in any horizontal direction whereby the axis of the two wheels are vertically over the axis of a shaft supporting two rotatable elements, so that when said vertical alignment is established a balanced condition will result in which the two wheels have their lowermost portions vertically over the uppermost portions of the two rotatable elements, means being provided to hold the vehicle in such vertical balanced relation and to lock said holding means against any direction of horizontal movement.

Another object is to provide an indicating dial with a pointer to register the running alignment condition of wheels being tested and to indicate a toe-in condition direction from a toe-out condition direction by the movement of said pointer, and in association therewith another indicating means to indicate to the operator when the two rotatable elements are both moving in the same axial direction at the same speed in right or left directions, as in steering.

Another object is to provide means that will automatically cause either or both of the rotatable elements to stop rotation when a prescribed distance of axial movement has been reached, as to insure against attempting alignment corrections when sufficient distance of axial travel does not exist.

Another object is to provide means comprising four points in alignment with each other whereby it is made possible for the operator to drive a vehicle to a location centrally and squarely on the alignment mechanism.

Another object is to provide preliminary locators ("curb" stops) so that the operator will be mindful of the proximity of the vehicle to its final location relative to the alignment mechanism.

Another object is to provide a portion of each of the two rotatable elements with a crowned pulley surface having guide walls or flanges on each side of said crowned surface so that a belt member when rotating the element will not contact said flanged portion on account of thus riding a crowned pulley.

Another object is to provide a straight, rigid, level axis shaft anchored against rotation and rigidly supported so that same will not yield downward because of any capacity load being thereby supported.

Another object is to provide a shaft, parallel to the axis shaft, and subjected to rotation with means whereby the rotational force thereof may be transmitted to the rotatable elements on said axis shaft, in such manner as to eliminate any tendency to generate any degree of axial thrust movement of the rotatable elements.

Another object is to locate all of the manipulative or central members within close reach of the operator.

Another object is to provide means to cause a spreading action between the steering wheels of a vehicle when under test so that the degree of the yield in the steering gear can be correctly detected, because of the known force applied and recorded according to its degree of effect in regard to the true running wheel alignment at speeds, because of carried loads by wheels, and any other resistance such as road drag or air resistance.

Another object is to provide means to control and apply an outward pressure between the two steering wheels of a vehicle axle of a specific pressure, while being rotated in their running direction.

Another object is to permit the operator to control the two testing rotatable elements with a mechanism whereby either one may be rotated individually and in either of two directions of rotation or the two rotatable elements can be rotated in unison and have their direction of rotation reversed in unison.

Another object is to provide a sighting means for use in properly locating a vehicle that may be moved out of interference position to permit of movement of the vehicle through and beyond the sighting station.

Another object is to provide means by which an operator may be able to shift wheels as in steering while engaged on the alignment mechanism for testing the running alignment thereof, and means whereby said wheels may be set and locked in a neutral direction of steering while the wheels are being revolved in their regular running direction.

Another object is to provide a clutch means by which to cause either or both of the two rotatable elements to remain in or out of operation, under control and setting by the operator.

Another object is to provide for illumination of the interior of the mechanism so the location of the rotatable elements may be observed at all times by the operator through openings for such view.

In the drawings, which illustrate the invention,

Fig. 1 is a diagram illustrating the reason for the right front tire wearing more than the left front tire because of an excess toe-in condition of wheel alignment.

Fig. 2 is a similar view illustrating the reason the left front tire wears more than the right front tire because of any degree of toe-out in the alignment condition.

Fig. 3 is another diagram illustrating the fact that a cambered wheel is determined to travel in a circle having the diameter of twice the slant altitude of a cone, and the effect of such travel as a detrimental factor to true running wheel alignment.

Fig. 4 is another diagram showing how an under-inflated tire, because of camber, can cause an error in the indicating means and that a weak side wall of a tire can cause the same error if not properly inflated.

Fig. 5 is still another diagram showing the relation of the caster angle to a vertical line and the proposition that excessive camber exists as an important factor in true running wheel alignment.

Figs. 6 and 7 are diagrams explaining the character of at rest or static friction relative to this invention.

Fig. 8 is a vertical sectional view of the invention taken on a line near the inner surface of the front or face plate and parallel thereo.

Fig. 9 is a central vertical sectional view taken through the machine at right angles to Fig. 1.

Fig. 10 is a detail longitudinal sectional view through one of the rotatable elements.

Fig. 11 is a detail fragmentary view partly in section of the connections for actuating the indicator means.

Fig. 12 is a detail horizontal sectional view taken on line XII—XII of Fig. 11.

Fig. 13 is a detail perspective view of a portion of the slide shaft employed in locating the center or axis of each of the two wheels vertically over the axis of the axis shaft.

Fig. 14 is a front elevation of the machine, showing wheels being tested thereon, the pit and other accessories not being shown.

Fig. 15 is a detail vertical sectional view through a part of the device used to cause an outward pressure between the two steering wheels.

Fig. 16 is a partial top plan view illustrating the use of a sighting means in association with the hood of a car located on the wheel aligner.

Figs. 17 and 17a are respectively a side and front view of the forward vertical member of the sight means for association with the car hood.

Fig. 18 is a front view as seen by the operator when using the sight means to drive the car properly on the alignment machine.

Fig. 19 is a perspective view of the sight means forming the rear sight to properly locate the car on the alignment machine.

Fig. 20 is a perspective view of the machine in the pit, including stairs, bridging means, and other features as proposed by my invention.

To be able to properly align the steering wheels of a vehicle or test the rear wheels thereof, an operator should understand the basic causes of the tire wear so that he is able, by the inspection of the tread condition of the tire, to comprehend whether a toe-in, toe-out or true running alignment condition exists. If he finds that the right front tire wears more than the left front tire, inflation being the same, then he should know that this condition is caused by excess toe-in.

Since the rear axle has a control effect over the front axle, the rear axle R, Fig. 1, urges the whole front axle F to follow a course which is at right angle to the axis of each axle. Because of caster C, of Fig. 5, and the "crown" surface of most roadways, the car tends to steer to the right. Because of such influence I, Fig. 1, a leftward correction C is required to eliminate such steering to the right. Of course, the right wheel R—W is thereby excessively turned leftward because toe-in status means that the right front wheel in the beginning is pointed leftward due to toe-in X, Fig. 1. It therefore is evident that due to the rear axle's "control" over the front axle, the required leftward correction places the left front wheel in better alignment with the wheels of the rear axle, and thereby the combined tractive efficiency of the two rear wheels and the left front wheel causes excessive wear to the right front wheel due to its side thrust alignment condition as set forth in Figure 1.

In Fig. 2, a toe-out condition X, because of caster and roadway crown requiring leftward correction, causes the left front tire to wear more than the right front tire. It will be noted that the wheels have a natural travel which is at ninety degrees to their axis.

The above key or basic knowledge is mandatory before intelligence can direct the engineering of mechanical components for the detection and correction of alignment trust conditions relative to wheel alignment.

The proof of the ability of the machine and the intelligence of the engineer are reflected in the condition of one front tire to that of the other front tire after time and service have had the opportunity to produce a readable result relative to the figures shown in 1 and 2. Therefore, accepting the aforesaid as guidance to govern degrees of correction relative to the many types of axles and steering connections, it is possible to establish a data table of toe-in requirements for each particular type, but in every case there must be a difference equivalent to the yield that exists in the alignment adjustment means of the car.

Static or what is sometimes known as at rest friction is most objectionable and its effect is illustrated in Fig. 6, wherein a wheel W is shown in rotatable and slidable engagement with its shaft S. When the wheel W is not rotated, the shaft S is required to be elevated at one end out of level relation with surface L, as shown, before the wheel will slide to the lower end of shaft in the direction of arrow A'. Static friction has to be eliminated by tilt before movement A' can begin.

In Fig. 7, when the wheel is being turned in the direction D, and the shaft S is stationary, then, because of the elimination of at rest or static friction, it is almost impossible to hold the shaft S sufficiently level to prevent the axial movement of the wheel W in the directions of the arrows A—B. By having my axis shaft in like engagement with my rotatable elements, it is evident that no resistance to axial travel can exist, because my axis shaft is rigidly supported and is level as well as being straight and stationary.

Before explaining the details of my invention, I think that it is best to cite some other common interferences that must be taken into consideration. For instance, a cambered wheel is determined to travel a circular course twice the slant altitude of the cone that its camber condition represents as in Fig. 3. When camber is excessive, then caster degree becomes a major factor in the alignment of the two wheels being tested. When camber is of a minimum degree, then caster is of little or no consequence in the alignment correction, but, nevertheless, because of any degree of camber, it is most important to have the axis of each of the two steering wheels vertically over the single axis of the axis shaft of the rotatable elements of the aligner if proper and correct results are to be secured.

Proper tire pressure is very essential to proper alignment by the present structure so that the "soft" tires cannot cause a false axial travel of the rotatable element of its axis shaft. In Fig. 4, E shows the direction of force, due to weight, affecting bulge A, greater than bulge B, and thus causing a side thrust D to bring about a false axial movement to the rotatable element C.

In order that the drawings and explanation may be simplified, numerous bolts, nuts and screws used as means to hold various parts together are neither shown nor mentioned. Conduits, pipes and the other common accessories for compressed air and electrical energy used therewith are omitted for the same reason.

The numeral 1, of Fig. 8, indicates the straight, level, rigid axis shaft of my invention which is rigidly supported by four frame-like members 2, and which is anchored against rotational movement by means of set screws 1a. Two rotatable elements 3 and 3a, on shaft 1, are constructed in this instance as shown in Fig. 10. In order that the axis shaft 1 may be immune from downward yield due to the weight of a vehicle having its wheels supported on the rotatable element, three hub bearing members 3b, 3c and 3d (see Fig. 10) have bearing bushings 4 of babbitt or like material of a so-called frictionless character. These three bearings as shown are to aid in the prevention of axis shaft 1 from yielding from straight and to prevent the action of gravity from interfering with accuracy of the machine. The hub of which 3b is a portion has a flange-shoulder engagement with a sleeve member 5. The hub of which 3c is a portion embraces 5 and 5a, which latter is a sleeve of the same diameter. The hub of which 3d is a portion is also provided with a flange-shoulder. By means of stay bolts 5b, 5b, these members are held together as a unit, and thus each of the rotatable elements 3 and 3a is made up.

Because it is undesirable to permit a belt to friction against either of the guide flanges, the pulley face member 6 is crowned as shown between a flange member 6a of pulley 6 and means to hold pulley 6 to concentric position with the unit serving as a rotatable element. The shoulder 3f as seen in Figure 10 is concentric to the axis shaft 1. By means of the bolts 6b, 6b, the pulley face member 6 is held to the hub, of which 3d is a portion, which hub also serves as a pulley flange at 6c.

A flange or collar 7 of each rotatable element is machined so as to run true with the rotatable element and serves as a medium to actuate an indicating mechanism shown in Fig. 1 and also in Fig. 11.

In Figs. 8 and 9, it will be noted that I-beams 8, 8 rigidly support the series of frame like members 2, and a series of leg members 9 support the I-beams 8, 8.

It is quite possible vehicle wheels for alignment tests will be driven onto the rotatable wheel supporting members 3 and 3a with wet tires and, in order to insure against slipping, I propose to provide the members 3 and 3a with a rough surface by means of sand or shellac or by any means effective to insure positive traction between the wheels and said wheel rotating members.

It will be noted that the rotatable elements 3 and 3a can slide axially on axis shaft 1 because of the space provided therebetween. This provision of axial movement is to permit the alignment thrust condition relative to the two wheels of an axle, to cause such axial movement when said wheels are being rotated in proper contact and location atop of elements 3 and 3a.

An electric motor 10, having a suitable speed reducing gear 11 and controlled from the switch panel 12, rotates axially aligned shafts 13. Each shaft 13 is straight and supported in alignment by means of the cross members 14. Each shaft 13 is in true parallel relation to the axis shaft 1. Keyed or pinned to the motor driven shafts 13 are two axially long faced pulleys 15, 16, for driving belts 15a, 16a as means to rotate the two rotatable elements 3, 3a.

A clutch means is provided by having the belts 15a, 16a in "loose" engagement with the pulleys 15, 16 and the crowned pulley faces 6, 6, so that either of the two belts may be "tightened" or "loosened" in operation to "clutch" or free the respective rotatable elements 3, 3a.

For each motor actuated pulley 15, 16 there is provided a shaft known as the clutch fulcrum shaft 17 supported by cross members 14. Shaft 17 supports a rigid member 18, which is keyed or pinned to said shaft so that member 18 positively moves with the shaft 17. An idler pulley 19 is revolvable on a shaft 19a, which shaft is held in place on the member 18 by being pinned. Shaft 19a, being always in parallel relation to the axis shaft 1, the motor driven shaft 13 and the shaft 17, it is obvious no axial thrust force may exist in the transmission of energy to create rotation of the elements 3, 3a.

An arm 19b, pinned or keyed to the shaft 17, will, when raised, cause the idler pulley 19 to tighten the belt 15a or 16a in driving relation to the element 3 or 3a.

The control handle 20, Figs. 9 and 14, is integral with a toggle link 20a, which is hinged to bracket bearings 20b. A threaded connecting rod 20c is in hinge joint engagement at its lower end with the arm 19b, by means of the hinge pin 20d. The threaded upper end of connecting rod 20c passes through an oscillatable member 20f, having pivoted engagement with the toggle member 20a, and a nut 20g makes adjustability possible for tightening the belt 16a.

In Figs. 9 and 14, the control levers 20 are located in the position for the rotation of the element 3 or 3a. It will be noted that the stop lug 20h, contacting the face of the machine, causes same to stop in an over-center position because the center line 21 is inward of the hinge pin 20d. When either control handle 20, including its part 20a, through the manipulation of the operator, is moved away from the face of the machine, then the strain as set up by the tightened belt 16 or 16a tends and does free up the belt so that rotation ceases relative to the rotatable element 3 and 3a.

The rotatable elements 3, 3a have limited movement in both directions and when such limits have been reached, it is proposed to warn the operator by release of driving tension on the belts 15a, 16a. This is accomplished by an arrangement to automatically shift the control handles 20 to unclutched position and includes cross shafts 22 supported in journal bearings 23 in the frame members 22. Each shaft 22 is thus permitted rotative movement, and each is held against endwise movement by collars 24 pinned thereto.

Conical members 24a rotatable on a stub-shaft 24b are capable of actuating the arms 24c when either rotatable element 3 or 3a by the axial movement thereof crowds any conical member 24a radially away from the axis shaft 1. Either shaft 22, through the means of being in pinned, fixed engagement with its arms 24c, is thereby caused to move in unison through such association and relation and in turn causes similar movement of its arm 24d, which is hingedly connected to one of the push rods 25.

Therefore, after the axial movement of either rotatable element 3, 3a has exceeded a desired distance of the axis shaft 1 in either direction, it is obvious that an actuation is available to automatically stop the rotation of such rotatable element 3 or 3a through the push rods 24 being in hinged engagement with arms 24d by means of the pins 25a.

A disk headed member 25b is in slidable engagement with each push rod 25, and a compression spring 25c is interposed between said member 25b and a pressure regulating nut 25d on the push rod. Thus when the push rod 25 is forced toward and against the connecting rod 20f, the latter is moved therewith until the toggle member 20a has moved far enough so that automatic stoppage of the rotation of the rotatable element 3 or 3a is caused by the loosening of the belts 15a and 16a.

Sometimes it is useful to restart the rotation of the rotatable element 3 or 3a, after this automatic disengagement has taken place. Therefore, the operator can, by manual force, compress the compression spring 25d momentarily by means of applying his strength to the control handle 20 or 21.

The motor 10 is anchored to a base member 10a, which as seen in Fig. 8 is bolted to certain of the supporting legs 9. The motor is purposely not shown in Fig. 9, in order to avoid confusion resulting from too much detail in the view of this figure.

26a are cover members for those portions of the machine above the rotable elements 3, 3a, and are provided with openings so that the tires of the vehicle wheels may make contact with the rotatable elements 3, 3a. 26b is a similar cover member used as a filler-floor between one end of the machine and the top of the adjacent wall of the pit. The cover members 26a and 26b have a top surface flush with that of the shop floor, as best observed by reference to Fig. 20.

A small but practical rib 26 is provided on the cover members 26a along the front and rear of its openings, so that the operator can feel the front wheels drop down onto the surface of the rotatable elements, thus serving as means to assist the operator to expedite the location of the vehicle to proper position.

The mechanisms for actuating the two indicating means utilize the axial movement of the rotatable elements 3 and 3a. The flange 7 of each of the rotatable elements rotates and can move axially on the axis shaft 1, when caused to do so by the alignment thrust condition existing between the two wheels of an axle. In Fig. 11 a member in the form of a U-shaped bracket 27 is a support acting as a guiding means for the actuating rods 27a and 27b. Member 27 is securely fastened to certain of the frame members 2, as shown in Fig. 8.

The actuating rod 27a is threaded on one end and adjusting nuts 27c serve as means to properly position two arms 27d to proper rolling engagement with the flange 7 of rotatable element 3a. The rods 27a slide freely through openings in the member 27. The actuating rod 27b is provided with similar adjustable arms in engagement with the flange 7 of rotatable element 3.

It is evident from Figs. 8 and 11 that a roller element 28, revolvable on a spindle shaft 28a and positioned between and in engagement with actuating rods 27a and 27b will be rotated fully or partially according to the movement of two actuating rods. If, as in Fig. 11, the actuating rod 27a moves in the direction of the arrow Y, and actuating rod 27b moves in the direction of the arrow Z, then the roller element 28 will rotate anticlockwise and, if the direction of movement of the actuating rods be reversed according to arrows Ya and Za, then the rotational direction of the roller element 28 will be clockwise. Through this provision, toe-in or toe-out thrust condition can be indicated as to degree and as to direction.

In order that relative movement of the roller element 28 and the actuating rods 27a and 27b will be positive and accurate, it is necessary that due pressure be effective at the contacting points thereof. Therefore, member 29 which supports shaft 28a is machined so as to accommodate an axis 29a for a frictionless roller 29b which bears on rod 27a. A milled out plunger 29c supports the axis member 29d of a frictionless roller 29e which bears against rod 27b. A compression spring 29f is housed in the member 29, causing a spring pressure force to be eventually applied to the axis pin 29a of the frictionless roller 29b, so that the actuating rods 27a and 27b are in spring pressed association with the roller element 28.

The member 29 is machined for threaded engagement with two horizontally outstanding guide rods 30, 30, which are slidably mounted through the sides of supporting member 27. It will be noted that if a steering thrust condition exists from the steering effort of the vehicle wheels when they are in perfect related wheel alignment, then both of the rotatable elements 3 and 3a will move right or leftward at the same speed and, therefore, there is no change of distance between them, and thus there is no relative movement between the actuating rods 27a and 27b. For this reason there is no degree of rotational movement indicated in an instrument operated by the spindle shaft 28a, to which the roller element 28 is fixed. Spindle shaft 28a has vertical clearance by means of the vertical elongation 29h, machined in the upper portion of the member 29, and this elongation prevents any possibility of interference with the spring pressure maintaining the rods and friction wheel in proper engagement to positive instrument actuation.

The depending portion 29g of the plunger 29c serves as a stem to actuate an instrument arm 31, shown in Figs. 11 and 12 and as assembled in Fig. 8, and this arm 29g operates to indicate right or left steering so that the operator may know which way to steer the wheels as they are being tested, to prevent travel of the rotatable elements axially on shaft 1 so far that said elements are caused to be automatically stopped from rotation, and in order that said rotatable elements may revolve in a zone best suited for such axial travel without possibility of reaching its limits.

The steering indicating arm 31 is in frictionless pivot engagement with the member 27 and, for this reason, has a boss 31a through which a screw 31b serves as a pivot, said screw being in threaded engagement with the member 27 as seen in Fig. 11. As the stem 29g moves in the directions of the arrows W—X of Fig. 12, then arm 31 swings in an arc permitted by its elongated hole 31c. Said arm thus moves to positions as indicated by dotted lines U—V.

As shown in Fig. 9, steering indicating arm 31 at its other end has a frictionless roller 31d to frictionlessly support said arm as it swings in its indicating movement. Roller 31d rolls on a radial track 31e, of which the screw bolt 31b acts as a radius point. To the steering indicating arm a pointer 31f is attached, and said pointer swings horizontally over a graduated member 31g, which informs the operator as to steering movement registered thereby as if to the right or to the left, so that he may steer the wheels being tested and thus make it possible for the wheels to revolve indefinitely in their running direction, as if on the highway, which is the same as unlimited wheel travel.

The wheel alignment indicator dial 32, Fig. 14, has a pointer hand 32a, which is fastened to a small shaft 32b, revolving in the boss 32c, a collar 32d being pinned to the shaft 32b to prevent excessive end play thereof. Shaft 32b has a universal joint connection 32e, which is an integral part of the universal connecting shaft 32f. Spindle shaft 28a has a universal joint connection 32g with the connecting shaft 32f. Because of this arrangement, it will be seen that any rotational movement of the spindle shaft 28a will be registered by the pointer 32a on the dial 32, and thus, if movement does occur to the pointer 32a, it is obvious that an error exists in the alignment condition of the wheels being tested.

The alignment and steering indicators are lighted by an electric light bulb 32h, and 32i is a shade or hood for this light. 32j is a handle so that the operator may move the pointer to any desired location. 31k is a handle for the operator to move the arm 31 to any desired location.

It is important that the vehicle wheels which are being tested for alignment condition be held against any horizontal movement bodily with respect to the machine and in a position wherein the axis of each of the two wheels will be located directly over or vertically above the axis shaft 1, as said wheels rest on the two rotatable elements 3 and 3a.

In Fig. 9, 33a in dotted lines represents the right front wheel of a steering or front axle 33c, a vertical line 33b intersecting the axis of the wheel and the axis shaft 1. The axle 33c of the vehicle is held tightly by two clamp members 34 and 35, tightened against the axle by means of the hand nut 35a and a bolt 34a which passes through openings in 34 and 35 made for such engagement. A shaft 36 shown in Figs. 9, 13 and 14 has slidable engagement with its support bearings 36a, so that the vehicle or car can be moved forward or backward after the clamping means, which comprise members 34 and 35, have been tightened. 37 is a connecting arm that can partially rotate on the shaft 36. In other words, the shaft 36 can be revolved within the member 37 because of its sleeve-like end 37a. However, 37b and 37c are collars that are pinned to said shaft to prevent member 37 from any axial movement on said shaft. The movement thus given member 37 relative to shaft 36 allows a permissible vertical movement, accompanied by a very slight movement which is axial to the axis shaft 1, although this does not reflect in the alignment reading because the two wheels being tested move equal distances in the same direction. This tolerance only reflects in the steering indication as a fluctuation, and so long as the fluctuation is active in one zone range, it is the same as if no axial shift occurred.

The nut 38 having threaded engagement with its stud thread binds 35 and 37 tightly together. Therefore, when the car is moved, the shaft 36 moves back or forward with the movement of the axle of the car. The forward or backward movement of the shaft 36 can be prevented by the means 36b, which is a type of thumb screw.

Sometimes in checking rear axles for wheel alignment, it is necessary to shift the axle of the car in a longitudinal direction, that is, axial to the axis shaft 1, and, therefore, there are two slidable shafts that slide in unison because of a rack and pinion arrangement. A general idea of these two shafts may be observed in Fig. 20, at 38 and 39, the shafts sliding in bearings 38a and 39a. As shown in Fig. 14, the lower side of each of these shafts is machined to be a rack for engagement with a pinion gear located within the top member of the aligner which is flush with the floor. The arrangement is common to such structure, excepting that two racks are actuated by one pinion gear shaft so as to eliminate any cramping that would occur if only one rack and pinion were used. The pinion gears are milled in the shaft 41. By turning the handle 42, the two shafts move in the same direction as the axis of the axis shaft 1. By turning the handle 42 clockwise or anticlockwise, then the shafts 38 and 39 move to the right or to the left, and with such movement, the member 43 also moves because 43 is pinned to the shafts 38 and 39 for that purpose. 44 of Fig. 14 is a set screw that is used to resist any horizontal movement.

It is obvious that by means of the associated parts, which include the shaft 36 and the two other shafts 38 and 39, the car axle can be shifted in any horizontal direction as might be required to properly locate the wheels thereof in respect to the axis shaft 1.

Prior to running the car on to the alignment mechanism constituting this invention, the operator sees to it that the bridge members 45 of Fig. 20 are in their proper place so that the car wheels will not drop into the pit, each member 45 of the bridging means being so arranged that it may be removed after the car has been located, so the operator may be unhampered as he is required to walk under the car to make corrections. The bridge members 45, of course, are then returned to their original location so the car may be driven over them. The bridge member 45 is supported by the surface 45a of the pit and brackets 45b of the aligner mechanism.

Before a car is driven on the alignment mechanism, it is proper procedure for the operator to know that sufficient air pressure is in the tires of the wheels being tested. Because of the importance of proper inflation and for the convenience of the operator, compressed air is piped to the pit. The air hose 45 for tire inflation is shown in the pit in Fig. 20. Air, in this instance, is also used as energy means to detect the condition of yield in the steering gear axle and tie rod connections in a manner to be presently described.

In most cars there is a hood hinge, so that each side of the hood covering the motor thereof can be raised or lowered. Therefore, said hinge is substantially at a right angle line, in other words, in a ninety degree relation, to the axis line of the front axle or wheels thereof.

In Fig. 19, there is shown a sight means comprising two sight members in right-angle relation with the axis line of the axis shaft 1. Attached to the hood of the car, as in Figs. 16 and 18, there is another sight means comprising two sight members which, by means of the hood hinge, are made to be at a right angle relation to the axis of the wheels and axle.

Through the medium of these two pairs of sight members and the eye vision of the operator, it is almost an effortless proposition on the part of the operator to accurately drive the car on the alignment machine so that the car will be located midway of the rotatable elements 3, 3a and establish a true parallel relation of the wheel's axis to that of the axis shaft 1 of the aligner.

Since it is ofttimes desirable after the wheel alignment has been corrected to run the car straight ahead and off of the aligner machine, rather than to back it off of the aligner, it is necessary that the sight means shown in Fig. 19 be such that said means can be temporarily moved aside or elevated to an out-of-the-way position.

In this instance, a supporting member 46, of Fig. 19, is fastened to the ceiling and to this member are fastened two hinge members 46a. A target 46b swingable on a pin 46c, supported by certain of the members 46a, is in the form of a narrow straight member loosely fitted on the hinge pin 46c, so that gravity will cause the target 46b to hang truly vertical. A view loop 46d is suspended from the member 46 by the same type of means and is, in the same manner, adapted to swingable movement. A view line 46e between the side members of 46d to the target 46a is at a ninety-degree angle to the axis of the axis shaft 1.

An arm integral to the target 46a has swivel engagement at 46f with a flexible cable 46h. Said cable is of a related length to the space between 46h and 46g when target 46b and view loop 46d are hanging in parallel vertical positions. To swivel connection 46g is likewise operatively connected another flexible cable 46i, which runs over a grooved pulley in a bracket 47j which is supported by the member 46. It is obvious, if the hanging cable end 46k is grasped by the operator, he has means to elevate the sight means assembly sufficiently to allow the car to pass freely under said sight means. After the car has passed, then the sight means, because of gravity, automatically and accurately relocates itself in the position described and shown.

Because of some cars having divided windshields, it is essential that means be provided whereby the same aforesaid elements can be employed but in spaced parallel relation to the center line of the hood, and for this reason, I have shown in Fig. 16 the hood hinge 47 in a ninety-degree relation to the front axle of the car 48, with two embracing members 47a and 47b so arranged that they may be placed in engagement with the hood hinge or a part of the hood which is in parallel alignment with the hood hinge and in offset relation thereto. In this figure 48a shows the glass of the windshield, whereas 48b shows the dividing member that conceals the hood hinge from the view line of the operator. In cars not having the dividing member 48b, the operator with one eye looks directly over the hood hinge and through the view loop 46d to the target 46b as he drives the car onto the aligner machine. Since this cannot be accomplished in instances where the windshield is divided, I have arranged members 47a, 47b and 47c integral to each other. The portion thereof 47c is provided with two bosses on the upper side thereof for supporting two vertical sight rods 47d and 47e, said two rods being in vertical longitudinally aligned relation to each other. An arm 49c is an integral part of 47c and has a boss 49d extending upward, which provides vertical slidable engagement with a rod 49, which has a foot member 49a of a material that will not scratch the paint of the hood.

In Figs. 17 and 17a are shown enlargements of the vertical sight rod 47e and a freely swingable plumb bob-like member 47f that serves as an indicator as to when sight rods 47e and 47d are vertical so as to match up with the vertical condition of the target 46bx and the view loop 46dx of Figs. 16 and 18.

In Fig. 17a, the plumb bob member 47f is swingable as shown by the dotted lines. The two vertical sight rods 47d and 47e, being united, are both made vertical through the means of the plumb bob member 47f and a vertically slidable rod member 49, since a thumb set screw 49b locks the rod 49 after said sight rods are made vertical. The whole sight means comprising 47d and 47e may be easily attached to and removed from a car hood.

The operator, after adjusting the sight means on top of the hood relative to the hood hinge, then drives and guides the car on the aligner by the means of the two sights atop the hood being in alignment with the operator's view line and through the view loop to the target. The operator drives the car slowly until the front wheels are between the ribs 26 seen in Fig. 20 and against 26 ridge which is nearest to the instrument side of the aligner. The operator then releases the brakes and walks down the pit stairway, so that he may clamp the axle member by means of the hand nut 35a and the other means which have been explained, so that the car can be moved backward or forward until the axis of each wheel is vertically over the axis shaft 1. The operator realizes when such a condition exists because of the balanced condition of the weight of the car on the wheels when the wheels are truly atop of the rotatable elements 3 and 3a.

Because of the yield in the adjustment means by which wheel alignment is corrected, it is most important that the degree of this yield be correctly determined while the steering wheels are being revolved in their running direction and while the full weight of that portion of the car which is supported by said wheels is supported in rotational contact with and upon the rotatable elements 3, 3a.

In consideration of the foregoing, a spreader means is used to place an outward pressure between the steering wheels and at a point forward of the axle of said wheels and at a height approximately the same as that of the axis of said wheels. This pressure is to be of a measured degree so as to be relative to the speed of which the car is driven and also relative to steering gears of such light structure that are liable to be springy.

Because the axles and bumpers of cars are so low, it is necessary that this spreader mechanism be of a structure that will permit of its removal, or of a folding character so that same will not interfere with any part of a car being driven on the aligner.

Two brackets 50, 50 at the front of the machine, see Figs. 9 and 14, serve as holders for the normal support of the spreader or pressure means comprising the elements 51, 51a, so that same will be out of interference with any part of the moving car. The spreader means comprises two supporting members 52 and 52a which are slidable on the top member 53 of the machine, and each of said members is provided with a lengthwise slot to permit slidability. A threaded stud 53a and a handwheel nut 53b serve to fasten the members 52 and 52a against movement. Each member 52, 52a is provided with a guide flange 52c shown in Fig. 15, so that the axis of the shaft 52d supported thereby will be in parallel relation to the similar shaft of the other, regardless of the required movement due to the different space between the tires of different cars. A bearing is provided in the portion 53e of each member 52 and 52a so that shaft 52d of Fig. 15 may have slidable and rotatable support. To shaft 52d is pinned two arm members 54 and 54a, each of said arms having a pressure shoe 55 for engagement with the side wall of one of the tires. Each of said arms is pinned to its shaft 52d, and the arm 54a has an extra portion or handle means 56 which is used in shifting or steering the wheels that are being rotated for alignment condition and correction.

Arm 54a is normally held by a threaded stud 56a having its other threaded end screwed into the member 52a. This stud is located in the radial slot 56b and by means of the hand nut 56c being tightened or loosened, the handle 56 of the member 54a can be moved for steering or locked against such movement, so that the wheels being tested can be made to steer straight ahead.

The cylinder member 51 of the spreader means has an extended portion 51b provided with a hemispherical end which has engagement with the socket 51c. The extension rod 51a of the pressure means has a similar type of end that has similar engagement with the arm 54a.

The piston rod 51d is hollow or bored out to allow the extension rod 51a to be slidable therein. The spaced holes 51e and 51f permit contraction or the lengthening of the pressure means when a removably insertable pin is inserted through said holes to provide a desired length thereof.

The piston of said rod is of common structure as is the cylinder and other parts thereof.

The cylinder 51 is provided with an inlet valve 57 and an outlet valve 57a. A compressed air hose 57b is properly connected to the cylinder 51 and to the outlet side of a common reducing valve 57c. Also on the outlet side of said reducing valve is a pressure gauge 57d which has communication with the reducing valve 57c and the air hose 57b. By means of the reducing valve 57c and the air pressure gauge 57d, a desired air pressure is provided in the hose 57b.

When the operator opens the inlet valve to admit pressure, the arms 54, 54a press the shoes 55 against the tires so as to eliminate the yield in the steering alignment adjustable means, and then by means of the handle 56 and its associated members, the wheels may be shifted by the operator as they move in steering the car.

After the alignment adjustments have been corrected, then the operator releases the air from within the cylinder by opening the exhaust or outlet valve 57a. He also throws the motor switch 58 to off position so that the motor will stop rotating. If for any reason he wishes to reverse the rotation direction of the motor, he can do so by using the reverse switch 58a. Switch 58b controls the light 32h for the instrument dial 32 and two lights 59 which are shown in dotted lines in Fig. 14 and which illuminate the inside of the machine, so that the operator may see location and axial movement of the rotatable elements 3 and 3a through the slots 60, 60.

After the operator releases the air from the cylinder 51 and the motor 10 has been stopped, he presses the cylinder 51 in the direction of the arm 54a so as to shorten the overall length of the pressure element, and then he removes the pressure means and lays it in its supporting hangers 50, 50.

Then the arm 54 is also removed and placed on its shelf 61. Arm 54a is also removed by unscrewing the hand nut 56c, and the associated parts of arm 54a, after removal, are placed on the shelf 62.

Then the set screw 36b is released and the car is pulled forward by the operator, after which the axle engaging clamping means are released and lowered out of the way so that the car is thus free to be driven off of the machine after the bridging means 45 have been replaced. The pull cable 46k is then used to elevate the view loop and target members so that the car may pass forward without any interference.

The machine as a whole is preferably bolted to a concrete island or base 63, centered within the pit, the walls of which, as before stated, provide spaces around the machine so that the operator has ready access to all necessary sides.

What is claimed is:

1. In a wheel alignment indicating mechanism, means for supporting and rotating the two wheels of a vehicle axle during alignment tests thereof, including a pair of elements, each supporting one of the wheels to be tested, supporting means upon which said elements are rotatable and axially shiftable in common and independently of one another, means for rotating said elements, means for registering the common axial movements of said elements, and separate means for registering the independent relative movements of the elements without respect to the common movements thereof.

2. In a wheel alignment indicating mechanism, a pair of spaced apart axially aligned rotatable elements forming a support and a driving means for a pair of wheels to be tested for alignment, means to rotate said elements, supporting means upon which said rotatable elements are axially shiftable by the wheels being tested, and means to register relative axial movements of said elements.

3. In a wheel alignment indicating mechanism, a pair of spaced apart axially aligned rotatable elements forming a support and a driving means for a pair of wheels to be tested for alignment, means to rotate said elements, supporting means upon which said rotatable elements are axially shiftable by the wheels being tested, registering means operable upon axial movement of each of said elements relative to the other, and means to shift the elements and the wheels in unison without actuating the foregoing registering means.

4. In a wheel alignment indicating mechanism, a pair of spaced apart axially aligned rotatable elements forming a support and a driving means for a pair of wheels to be tested for alignment, means to rotate said elements, supporting means upon which said rotatable elements are axially shiftable by the wheels being tested, means to register axial movement of said elements, means to shift the elements and the wheels in unison without effecting registration of their relative movements, and means to register movement of the elements in unison apart from the registration of their relative movements.

5. In a wheel alignment indicating mechanism, rotatable members for independently supporting and driving a pair of wheels to be tested for alignment, supporting means in connection with which said rotatable members are mounted for relative yielding movements laterally with the tractive urge of the wheels, means to register yielding movements of said rotatable members, and means to rotate said rotatable members including clutches independently controlling said rotatable members and permitting manual regulation of the speed of rotation thereof.

6. In a wheel alignment indicating mechanism, rotatable members for independently supporting and driving a pair of wheels to be tested for alignment, supporting means upon which said members are rotatably mounted for relative yielding movements laterally with the tractive urge of the wheels, means to register yielding movements of said rotatable members, and means to rotate said rotatable members including a clutch for each of said members, said clutches being manually operable in unison and independently of one another.

7. In a wheel alignment indicating mechanism, a rigidly supported axis shaft, a pair of traction drums for supporting and driving the wheels of an axle aligned above said shaft, said drums being rotatable in spaced relation on said axis shaft and independently slidable axially thereof, motor operated means for imparting rotation to said drums, means for shifting the wheels and drums in unison, means for registering the extent of such united shifting movements, and means for registering the slidable shifting movement of each drum relative to the other including an actuating member bodily movable without actuation with the first-mentioned shifting means.

8. In combination with two wheel supporting members shiftable toward and away from one another under non-alignment thrust impulses of traction wheels supported thereon and rotated thereby, a registering dial and pointer, a spindle shaft having universally jointed connection with said pointer, a support for the spindle shaft movable between the rotatable supporting members, a friction wheel on the spindle shaft, and actuating elements extending from said rotatable members and between which the friction wheel is engaged, to thus rotate the spindle shaft upon shifting movement of either rotatable member relative to the other and at the same time permit their movement in unison in the same direction without rotating the spindle shaft.

9. In a wheel alignment indicating mechanism, a rigidly supported axis shaft, a pair of traction drums supporting and driving the wheels of an axle aligned above said shaft, said drums being rotatable in spaced relation on said axis shaft and independently slidable axially thereof, a pair of transmission drums, a belt in loose non-driving connection between each transmission drum and one of said traction drums, a tensioning roller movable against each of said belts to tighten the same in driving relation to the parts connected thereby, and a manually controlled lever for shifting each of said rollers and holding the same in and out of effective position.

10. In combination with two rotatable wheel supporting members shiftable toward and away from each other under non-alignment thrust impulses of wheels being tested thereon, means to indicate shifting movement of either member relative to the other, including an actuating element movable without action with the said members when the latter are shifted in unison, and a device for pressure between and against the wheels being tested to insure shifting movement properly in unison.

11. In a wheel alignment indicating mechanism, a pair of spaced apart axially aligned rotatable elements forming a support and a driving means for a pair of wheels to be tested, means to rotate said elements, supporting means upon which said rotatable elements are axially shiftable by the wheels being tested, means to register relative axial movements of said elements, and means in the path of movement of each of said rotatable elements and engageable thereby to automatically disconnect the said driving means upon excessive axial shifting movement of either of said elements.

12. In a wheel alignment mechanism, the combination of spaced apart axially aligned rotatable elements forming a support and driving means for the wheels of an axle aligned above the axis of said elements, a pressure actuated spreading device for interposition between the wheels so supported, including means to engage the wheels at axle height while in rotation, and means for registering the pressure within said spreading device required to take up the yield in the wheel steering connections.

13. In a wheel alignment mechanism, the combination of spaced apart axially aligned rotatable elements for supporting and rotating the wheels to be tested for alignment, means for clamping the wheel axle vertically above the axis of said elements, means for rotating said elements in such manner as to provide for their independent axial movement, means to register axial movements of said elements, means adjustably engageable with the wheels during rotation for pressing the same to the limit of the yield of their steering connections, and means to register the pressure required of said last-named means, whereby toe-in corrections may be made truly relative to the yield in the steering connections.

14. In a wheel alignment mechanism, the combination of axially aligned rotatable elements for independently supporting and driving a pair of vehicle wheels, means supporting said elements for rotation and for independent axial movement, means independent of said supporting means for rotating said elements to cause rotation of the vehicle wheels, said elements having rough surfaces to insure traction with the wheels, and means for registering axial movements of either and both of said elements.

15. In an apparatus for measuring vehicle steering wheel alignment, means for applying pressure against steering wheels at approximately axle height in a manner to cause yield in the steering connections of said wheels while permitting rotation of the wheels, and means to register the degree of toe-in of the wheels while rotative to compensate for the yield in the wheel connections.

16. In an apparatus for measuring vehicle steering wheel alignment, pressure means engageable with the steering wheels in a manner to cause yield in the steering connections of said wheels, and means to register the degree of toe-in of the said wheels while subjected to said pressure to compensate for the yield in said steering connections existing in normal running of said vehicle.

17. In an apparatus for measuring the true running alignment condition of the two related steering wheels of a vehicle steering mechanism including alignment adjustment connections between said wheels subject to yield when the vehicle is operated in normal running use, means including a pressure indicator for applying pressure against each of said wheels at approximately axle height thereof in a manner to cause the wheel connections to yield as in normal running, means to measure the said yield of the wheel connections incident to a predetermined pressure thereagainst of said first named means, and means to indicate the true degree of toe-in relation of the said wheels while said pressure applying means engage the wheels and the yield of the wheel connections is approximately that of normal running condition.

18. In a wheel alignment indicating mechanism, rotatable members for independently supporting and driving a pair of wheels to be tested for alignment, supporting means in connection with which said rotatable members are independently journaled for rotation and for relative and common axial movements with the tractive urge of the wheels during rotation, means to register axial relative and common movements of said rotatable members, and means independently of said supporting means to individually rotate said rotatable members including means for reversing the direction of rotation of each member.

19. In a wheel alignment indicating mechanism, a rigidly supported axis shaft, a pa'r of traction drums for supporting and driving the wheels of an axle aligned above said shaft, said drums being independently rotatable in spaced relation on said axis shaft and slidable axially thereof independently of, and in common with, one another by the wheels being tested, motor operated means for simultaneously and independently rotating said drums on the said axis shaft, and means for registering sliding axial wheel-actuated movements of said drums relative to, and in common with, one another.

GEORGE H. TABER.